US010674874B1

(12) United States Patent
Guidarelli

(10) Patent No.: US 10,674,874 B1
(45) Date of Patent: Jun. 9, 2020

(54) PORTABLE SHOWER CADDY

(71) Applicant: Joseph Guidarelli, Schenectady, NY (US)

(72) Inventor: Joseph Guidarelli, Schenectady, NY (US)

( * ) Notice: Subject to any disclaimer, the term of this patent is extended or adjusted under 35 U.S.C. 154(b) by 0 days.

(21) Appl. No.: 16/516,469

(22) Filed: Jul. 19, 2019

(51) Int. Cl.

| | |
|---|---|
| ***B60Q 1/124*** | (2006.01) |
| ***A47K 3/28*** | (2006.01) |
| ***A47G 1/02*** | (2006.01) |
| ***A45D 42/10*** | (2006.01) |
| ***A45D 42/16*** | (2006.01) |
| ***F21V 33/00*** | (2006.01) |
| ***A45D 42/14*** | (2006.01) |
| *F21Y 103/00* | (2016.01) |

(52) U.S. Cl.
CPC .............. *A47K 3/281* (2013.01); *A45D 42/10* (2013.01); *A45D 42/14* (2013.01); *A45D 42/16* (2013.01); *A47G 1/02* (2013.01); *F21V 33/004* (2013.01); *F21Y 2103/00* (2013.01)

(58) Field of Classification Search
CPC ........ A45D 42/10; A45D 42/14; A45D 42/16; A47G 1/02; A47K 3/281
USPC .................................................. 362/253, 458
See application file for complete search history.

(56) References Cited

U.S. PATENT DOCUMENTS

2009/0145801 A1* 6/2009 Moon .................... A47K 3/281 206/581

* cited by examiner

*Primary Examiner* — Jason M Han
(74) *Attorney, Agent, or Firm* — Mitchell Law PLLC; Matthew W. Mitchell

(57) ABSTRACT

A shower caddy is disclosed. The shower caddy includes a first foldable cover, attached to a back cover via a first spine, the first spine defined by a first set of vertical fold lines, a second foldable cover, attached to the back cover via a second spine, the second spine defined by a second set of vertical fold lines, wherein the back cover includes a generally rectangularly-shaped surface having a mirror, and at least one light.

20 Claims, 9 Drawing Sheets

PORTABLE SHOWER CADDY

TECHNICAL FIELD

This disclosure relates to bath accessories and, in particular, to a shower caddy for portable transport of showering and toiletry supplies.

BACKGROUND

The statements in this section merely provide background information related to the present disclosure and may not constitute prior art.

Holders for articles such as toiletries are well known in the art. These holders encompass a variety of devices designed to hold various grooming and cleaning materials and devices. These holders are typically designed for traveling and therefore are small and sealable. These known holders are not intended for carrying into a shower, and therefore lack hanging means and water drainage features. In some showers, light is low or unavailable. Hence, it would be desirous to provide illumination for safe grooming.

Hence, a need exists for a portable shower caddy having easy hanging features and illumination for safe grooming.

SUMMARY

A shower caddy is disclosed. The shower caddy includes a first foldable cover, attached to a back cover via a first spine, the first spine defined by a first set of vertical fold lines, a second foldable cover, attached to the back cover via a second spine, the second spine defined by a second set of vertical fold lines, wherein the back cover includes a generally rectangularly-shaped surface having a mirror, and at least one light.

One embodiment of the shower caddy includes a stand for positioning the caddy upon a table or flat surface to use.

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which.

DETAILED DESCRIPTION

Figure 1:
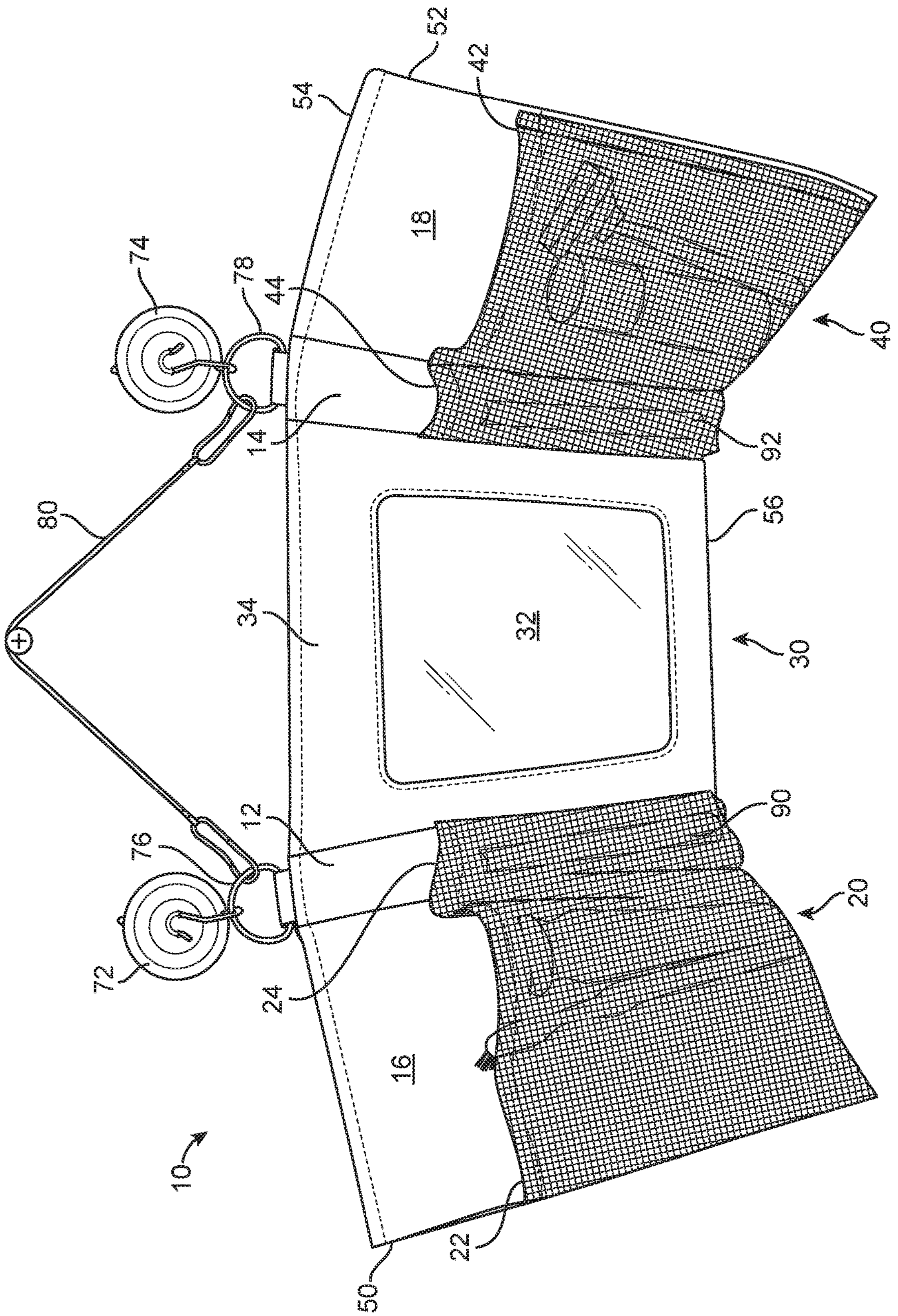
FIG. 1 shows an exemplary portable shower caddy in an open position, in accordance with the present disclosure.

Reference throughout this specification to "one embodiment," "an embodiment," or similar language means that a particular feature, structure, or characteristic described in connection with the embodiment is included in at least one embodiment of the subject matter of the present disclosure. Appearances of the phrases "in one embodiment," "in an embodiment," and similar language throughout this specification may, but do not necessarily, all refer to the same embodiment.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

As used in the description herein and throughout the claims, the following terms take the meanings explicitly associated herein, unless the context clearly dictates otherwise: the meaning of "a," "an," and "the" includes plural reference, the meaning of "in" includes "in" and "on." The term "based upon" is not exclusive and allows for being based on additional factors not described, unless the context clearly dictates otherwise. Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner.

Figure 2:
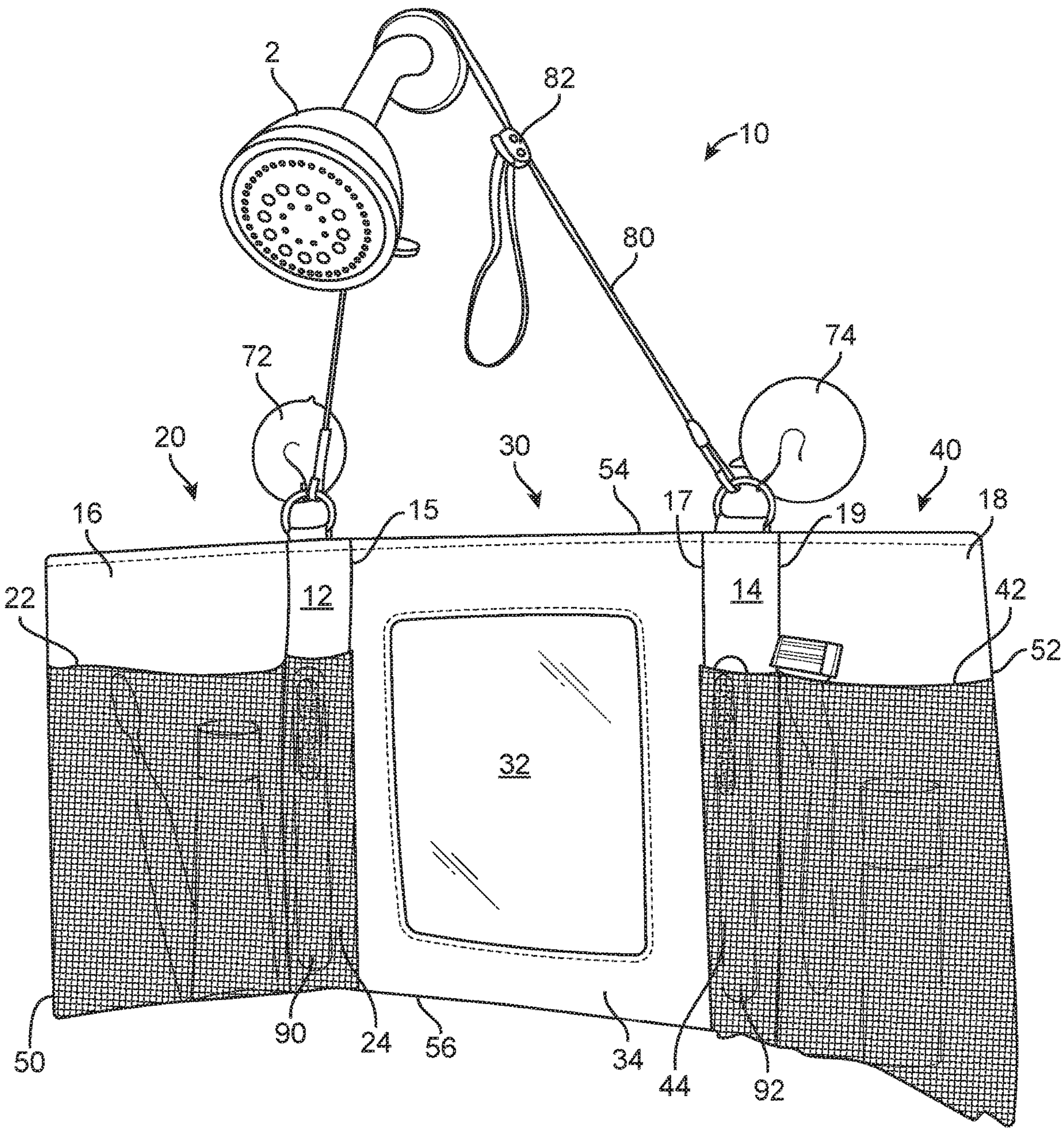
FIG. 2 is another view of the shower caddy in an open position, hanging from a shower head, in accordance with the present disclosure.
Figure 3:
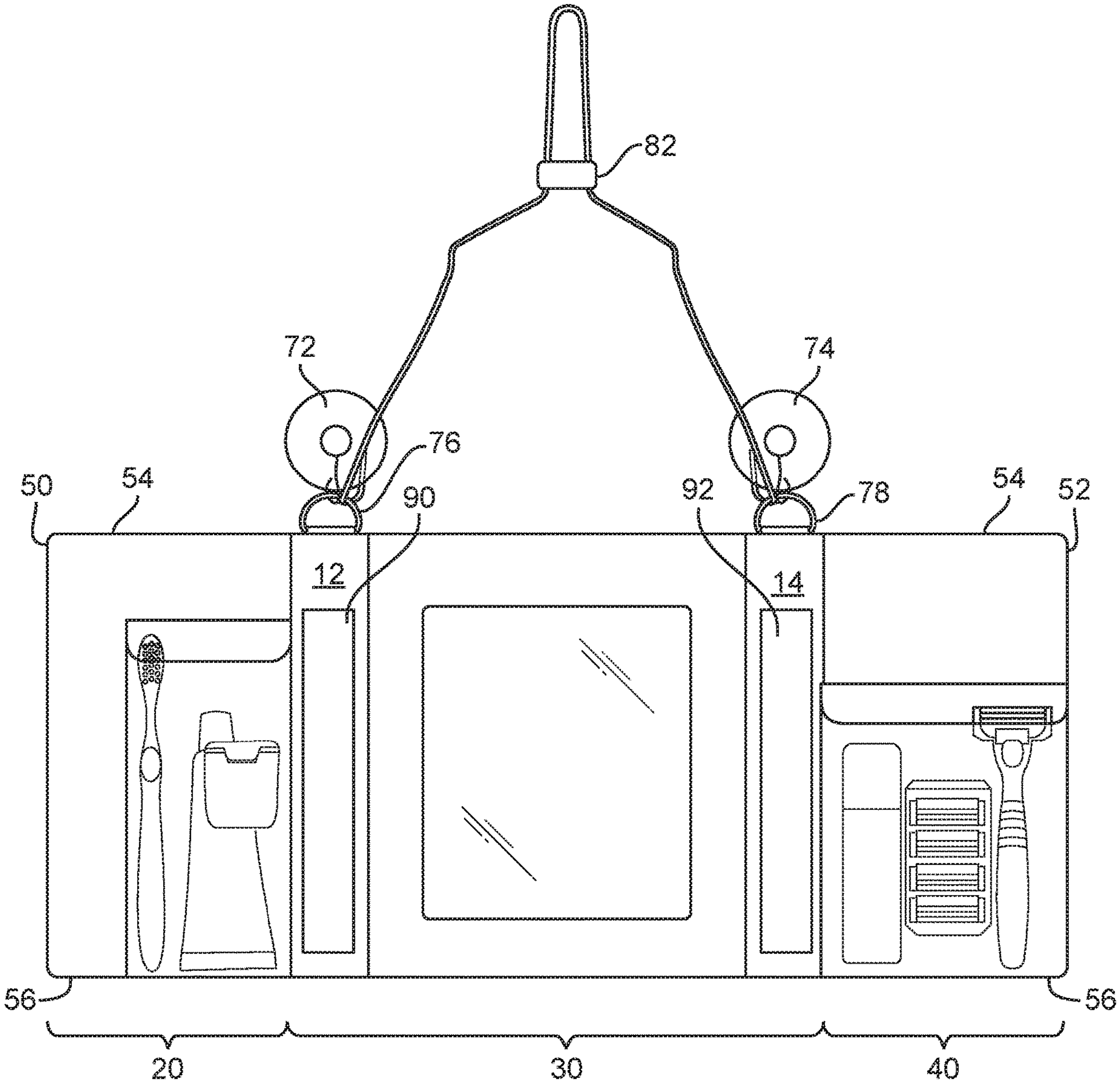
FIG. 3 is an exemplary plan view of the shower caddy in an open position to illustrate use, in accordance with the present disclosure.
Figure 4:
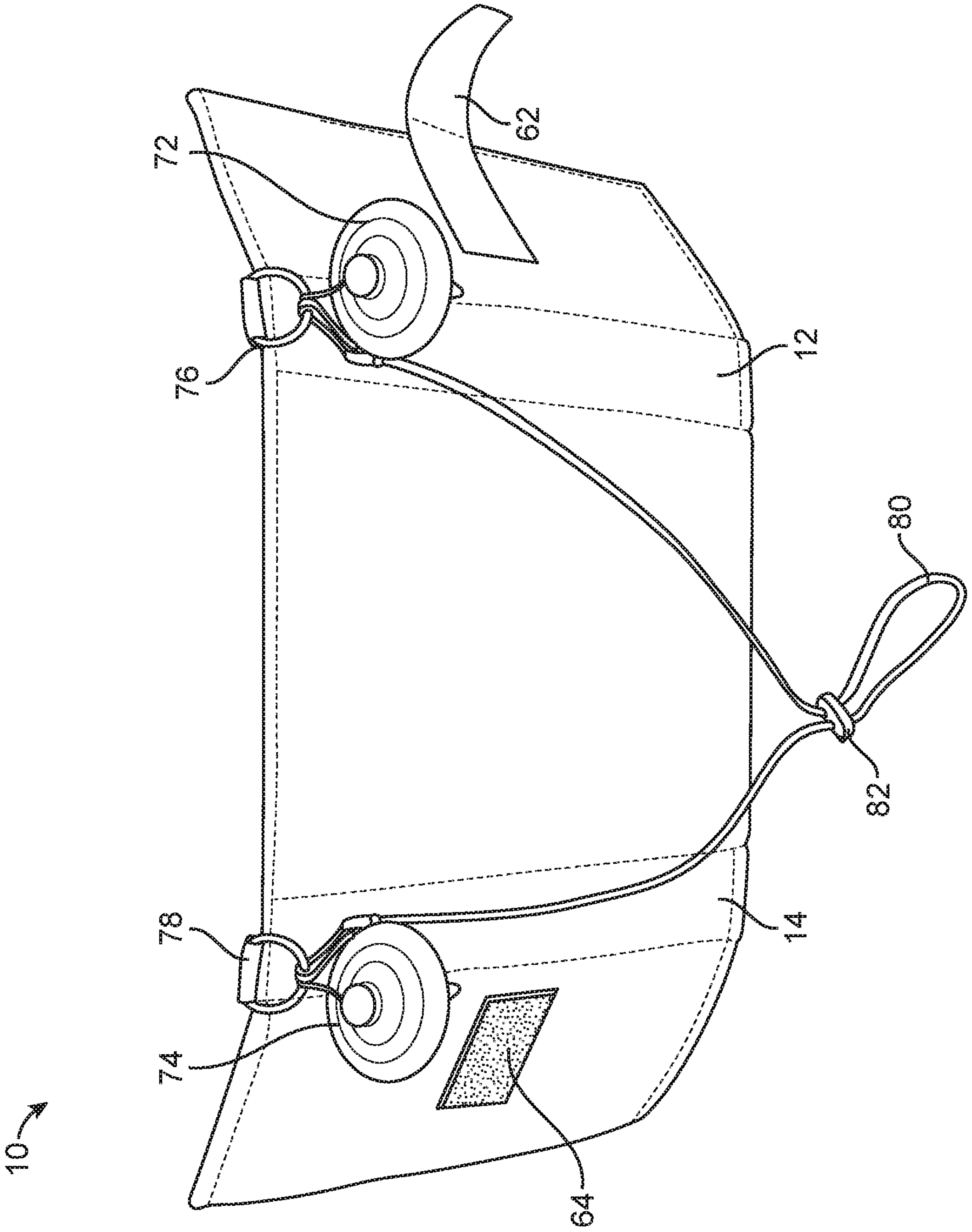
FIG. 4 is a rear view of part of the shower caddy in a open position, in accordance with the present disclosure.

Referring now to the drawings, wherein the depictions are for the purpose of illustrating certain exemplary embodiments only and not for the purpose of limiting the same, FIGS. 1-3 show an exemplary of the shower caddy 10 in an open position, from which a user may use the features thereof. As FIGS. 1-3 show, the shower caddy 10 is formed of three main sections: a first section 20, forming the left portion of the caddy 10, a second, main section 30, forming the middle portion, and a third section 40, forming the right portion of the caddy 10.

As illustrated for example in FIGS. 1-3 show, a shower caddy 10 is shown, which is formed to hold toiletry and grooming items within its pockets, a mirror 32, and lights 90 and 92, as described in greater detail herein below. The shower caddy 10 includes a first spine 12, a second spine 14, a first cover 16, and a second cover 18, and a back cover 34. The first cover 16 is connected to the first spine 12 along a fold line 13. The back cover 34 is connected to the first spine 12 along a fold line 15, and connected to the second spine 14 along a fold line 17. The second cover 18 is connected to the second spine 14 along a fold line 19. The spines 12 and 14, and the covers 16, 18, and 34 define the outer edges of the shower caddy 10, i.e., a left-side edge 50, a right-side edge 52, a top edge 54, and a bottom edge 56.

The first spine 12, second spine 14, first cover 16, second cover 18, and the back cover 34 are each preferably formed of a relatively rigid and continuous material to give the respective covers and the spines a body with dimensions. The respective inner bases provide structural support, yet are somewhat flexible so that the covers are able to bend or slightly contour around the items being held with some resistance. In one embodiment, the spines 12 and 14, and the covers 16, 18, and 34 are formed of a silicon-based material.

In one embodiment, first spine 12, second spine 14, first cover 16, second cover 18, and the back cover 34 each include an inner plate and an outer material. In one embodiment, first spine 12, second spine 14, first cover 16, second cover 18, and the back cover 34 are formed of a continuous, integral material, which is pinched to form the fold lines 13, 15, 17, and 19. In one embodiment, wherein the first spine 12, second spine 14, first cover 16, second cover 18, and the back cover 34 each include an inner plate or a single continuous integral plate that is pinched is used, the inner plate(s) are formed of marine grade canvas. The inner plate(s) provide structural support and are relatively flexible. Each inner plate extends substantially throughout the complete width and length of each of the first spine 12, second spine 14, first cover 16, second cover 18, and the back cover 34.

In one embodiment, an enclosure or shell is fabricated enclosing the inner plate(s) to form the spines 12 and 14 and the covers 16, 18, and 34. Preferably, the shell is formed from a woven fabric material which can be treated with a UV resistant and water-repellent coating. The fabric material may be formed from canvas, nylon, polyester, or polyvinyl chloride. The shower caddy 10 may be any size, but in one embodiment is sized and adapted to accommodate travel and/or regular-sized toiletry and grooming items.

The shower caddy 10 has a mesh pocket on at least one side of either the left or right sections 20 and 40, respectively. As illustrated by way of example in FIGS. 1 and 2, the left or right sections 20 and 40 each have a mesh pocket 22, and 42, respectively. In various embodiments, mesh pockets 24 and 44 on the spines 12 and 14 are included for holding a lighting device. The mesh pocket or pockets 22 and 42 functions to store and carry items within the shower caddy 10. The mesh fabric material allows a user to visually check quickly to determine if a particular item is within the shower caddy 10, and aids in water drainage and reduced drying time. The pockets 22, 24, 42, and 44 are preferably flexible and resilient so that items may be easily inserted through an opening and held within the pocket, and conversely easily taken out of the pocket through the opening. In one embodiment, a pocket may be coupled to the exterior surface of the shower caddy 10 along most any position or angle. That is, the placement of the pocket is not limited to the inside covers and spines as illustrated nor the dimensions and positions.

The mesh pockets 22, 24, 42, and 44 may be constructed in several manners such as, but, not limited to a permanent mesh type material for holding products, a detachable mesh, or, net type material, a permanent vinyl, or, flexible plastic, a rigid, or stiff, yet, pliable and retractable plastic and any other type of compartmental type of holding apparatus. In one embodiment, one or more of the pockets 22, 24, 42, and 44 are sealable via a magnetic closure. In one embodiment, at least one pocket is provided having waterproof sealing and made of transparent material for enclosure of a mobile device, such as a cell phone. In this way, a user may use the mobile device by viewing through the pocket. In one embodiment of the caddy 10, a water resistant or water proof speaker may be attached for selective communication with a mobile device. In this way, a user may keep the mobile device out of the water, while still directing music or other audio to a user in proximity to the wet environment, i.e., shower.

In one embodiment, the pocket 22 substantially covers the left section 20 of the shower caddy 10, and is coupled to the cover 16 along three of the four edges, with an opening along the other edge. As shown in FIGS. 1 and 2, the pocket 22 is coupled to the cover 16 along the fold line 13, the left-side edge 50, and the bottom edge 56, leaving an opening along a top edge.

In one embodiment, the pocket 42 substantially covers the right section 40 of the shower caddy 10, and is coupled to the cover 18 along three of the four edges, with an opening along the other edge. As shown in FIGS. 1 and 2, the pocket 42 is coupled to the cover 18 along the fold line 19, the right-side edge 52, and the bottom edge 56, leaving an opening along a top edge.

The spine pockets 24 and 44 each substantially cover the respective spines 12 and 14. Pocket 24 is coupled to the spine 12 along three of the four edges, with an opening along the other edge. As shown in FIGS. 1 and 2, the pocket 24 is coupled to the spine 12 along the fold lines 13 and 15, and the bottom edge 56, leaving an opening along a top edge. Pocket 44 is coupled to the spine 14 along three of the four edges, with an opening along the other edge. As shown in FIGS. 1 and 2, the pocket 44 is coupled to the spine 14 along the fold lines 17 and 19, and the bottom edge 56, leaving an opening along a top edge.

In one embodiment, the shower caddy 10 includes a mirror 32 on an inner surface of the back cover 34 of the main section 30. The mirror 32 formed of reflective, lightweight, flexible material. In one embodiment, the mirror 32 is a steam-resistant or fogless mirror. The mirror 32 may be stitched or otherwise adhered to the inner surface of the back cover 34.

Figure 5:
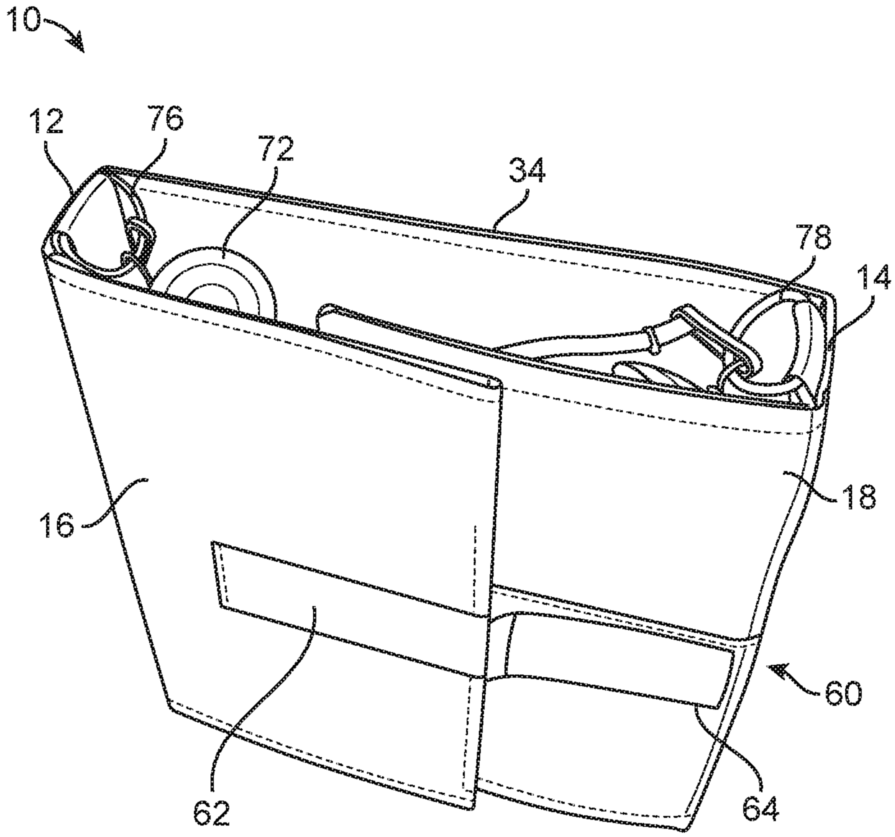
FIG. 5 is a perspective view of the shower caddy in a closed position, in accordance with the present disclosure.

The shower caddy 10 preferably includes a closure mechanism 60 which may be a zipper, string and eyelets, a hook and loop fastener system, or another suitable closure mechanism. As shown in FIG. 5, a hook and loop fastener system is used to secure the caddy 10 into a closed position. The hook and loop fastener 60 includes a flap 62 and a strip 64. In one embodiment, the flap 62 is adhered to the cover 16, while the strip 64 is adhered to the cover 18. To close, the cover 18 is folded, and the cover 16 is folded over cover 18, to which the flap 62 is pulled and selectively adhered to the strip 64.

As shown in FIGS. 1-3, an exemplary embodiment of the shower caddy 10 includes a first and second suction cups, 72 and 74. As shown, the suction cups 72 and 74 are each attached to a ring 76 and 78, respectively, which can be a D-shaped ring. The suction cups 72 and 74 secure the caddy 10 to a shower wall, or other flat vertical surface, and generally may function to inhibit tilting of the caddy 10. The suction cups 72 and 74 are composed of a waterproof material, which may include any of a variety of different elastomeric materials, which are known in the art. The suction cups 72 and 74 may be attached to the shower caddy 10 in other positions and via other mechanical means. The caddy 10 can include any number of additional suction cups.

The shower caddy 10 preferably includes a cord or strap 80 for hanging the caddy 10 on a shower head 2. The strap 80 can be attached to the caddy 10 at the rings 76 and 78. In one embodiment, the strap 80 includes clips at either end for attached to the rings 76 and 78. In one embodiment, the strap 80 is length adjustable via a clip 82, which is configured to lock a selected cord length in place.

As shown schematically in FIG. 3, and shown contained in pockets 24 and 44 in FIGS. 1 and 2, the caddy 10 preferably includes lighting devices 90 and 92. The lighting devices 90 and 92 may be a strip of LED lighting devices.

The lighting devices 90 and 92 may be adhered to a surface using, for example, a silicon adhesive. In one embodiment of the shower caddy 10, the lighting devices 90 and 92, are embedded within a surface of the caddy 10. The lighting devices 90 and 92 are preferably elongated and formed within a waterproof or water resistant housing. In one embodiment, the lighting devices 90 and 92 are light-emitting diodes. In one embodiment, the lighting devices 90 and 92 are removable from pockets 24 and 44. In one embodiment, the lighting devices 90 and 92 are rechargeable.

Figure 6:
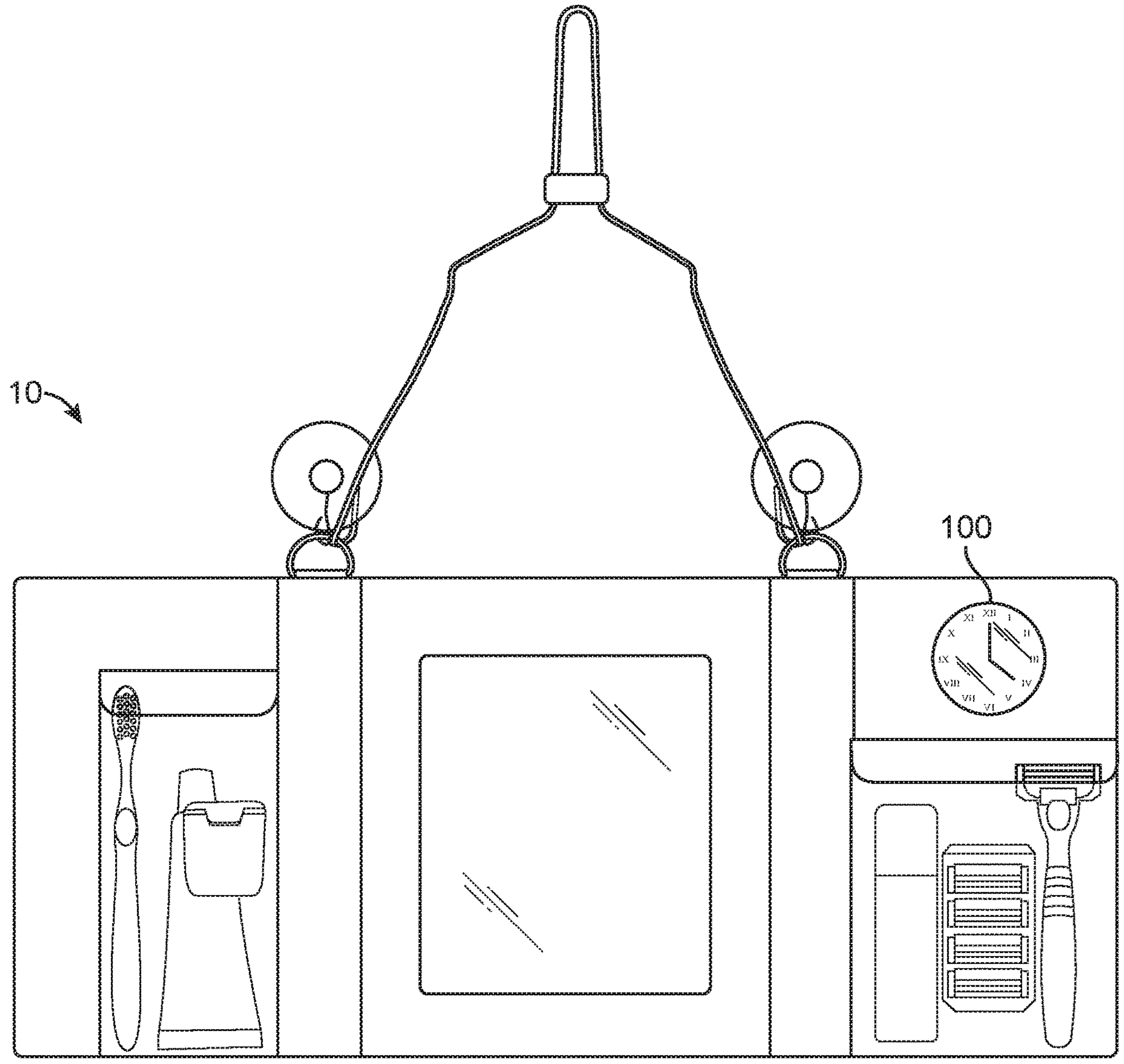
FIG. 6 is an exemplary plan view of an embodiment of the shower caddy having a clock, in accordance with the present disclosure.

FIG. 6 shows an exemplary shower caddy 10 having a clock 100. The clock 100 may be attached to any inner surface of the caddy 10. In one embodiment, the clock 100 is electric and rechargeable. The clock 100 can display the time in any manner as known in the art e.g., digital numbers, analog with roman numerals, etc.

Figure 7:
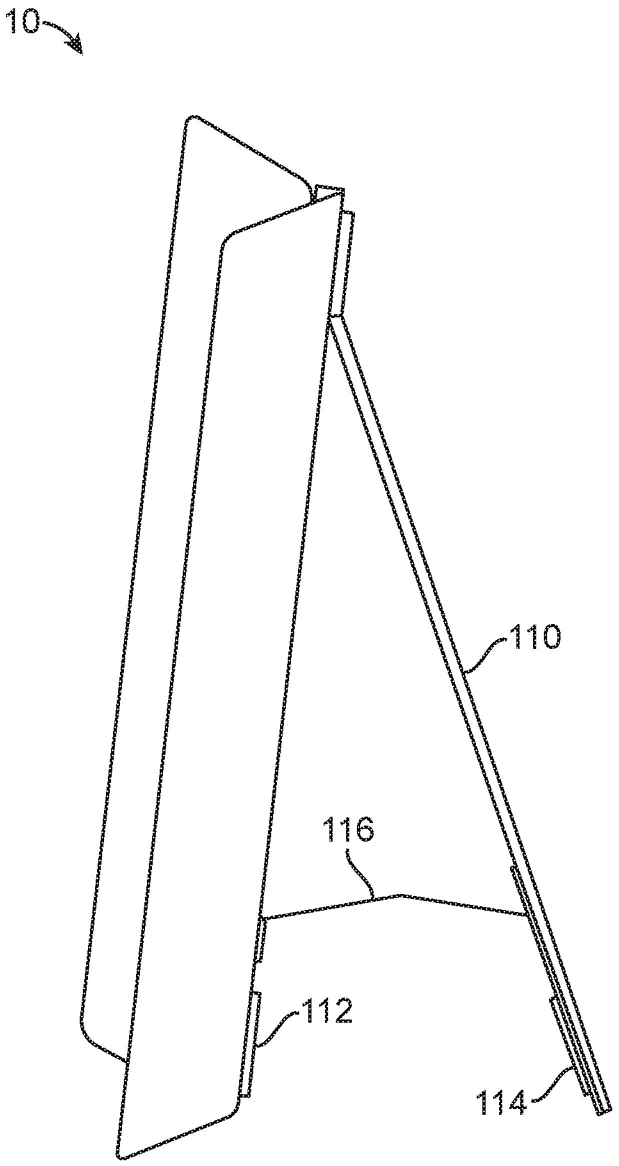
FIG. 7 is a side view of an exemplary embodiment of the shower caddy having a stand, in accordance with the present disclosure.
Figure 8:
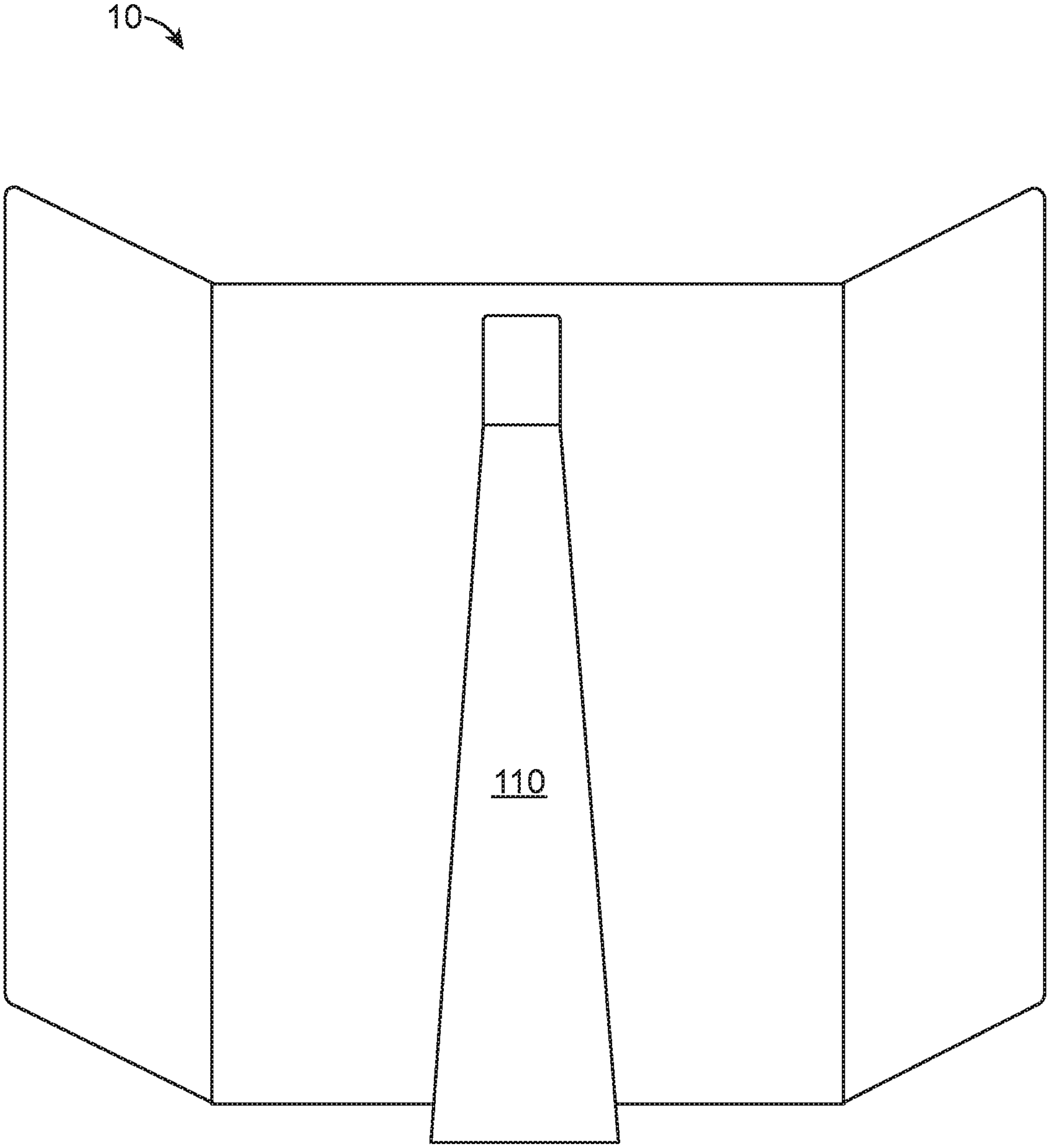
FIG. 8 is a rear view of the exemplary shower caddy having a stand, in accordance with the present disclosure.

FIGS. 7 and 8 illustrate an embodiment of the shower caddy 10 having a stand 110. The stand 110 may be coupled to a back of the caddy 10 using hook and loop fasteners 112 and 114, respectively. When the stand 110 is pulled, the hook and loop fasteners 112 and 114 disengage. The stand 110, may then rotate from the back surface of the caddy 10 by a distance limited by a cord 116 or other band of flexible materials that is adhered to both the back of the caddy 10 and the stand 110. The stand 110 may be selectively utilized when using the caddy 10 on a table or other surface. In this way, a user may shave, use the lights 90 and 92, or otherwise access features of the caddy 10 when outside of a shower.

Figure 9:
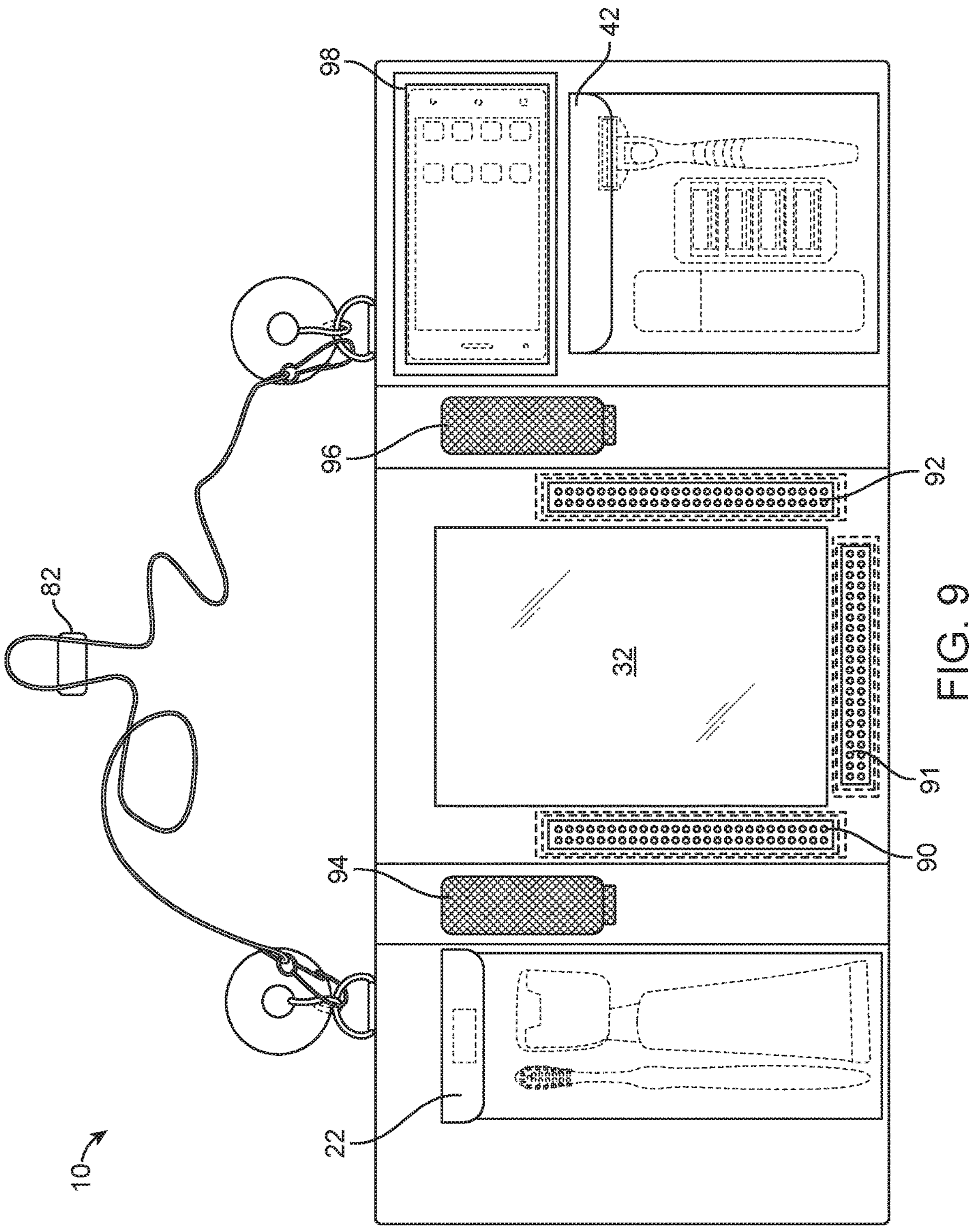
FIG. 9 shows another embodiment of the shower caddy, in accordance with the present disclosure.

FIG. 9 shows another embodiment of the shower caddy 10 having first and second speakers 94 and 96, respectively. The speakers 94 and 96 may be coupled to any surface of the caddy 10, including, as FIG. 9 shows, the spines 12 and 14. As FIG. 9 shows, the caddy 10 may include a clear, water-proof pocket sized and configured for a mobile device. In this way, the user may operate the mobile device to, for example, control the speakers 94 and 96. Further, as FIG. 9 shows, another lighting device 91 may be included on the interior surface of the caddy 10. These lighting devices 90, 91, and 92 may be strips of LEDs as shown.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

The invention claimed is:

1. A shower caddy, comprising:

a first foldable cover, attached to a back cover via a first spine, the first spine defined by a first set of vertical fold lines;

a second foldable cover, attached to the back cover via a second spine, the second spine defined by a second set of vertical fold lines, wherein the back cover includes a generally rectangularly-shaped surface having a mirror; and at least one light.

2. The shower caddy of claim 1, wherein the mirror is a steam-resistant mirror having opposed side margins and a width less than a total width of the back cover.

3. The shower caddy of claim 1, wherein the first spine includes a mesh pocket attached at one of the fold lines.

4. The shower caddy of claim 1, further comprising:

a flexible cord or strap for hanging the shower caddy on a shower head.

5. The shower caddy of claim 4, wherein the flexible cord includes a length adjustable clip.

6. The shower caddy of claim 1, further comprising:

at least one suction cup.

7. The shower caddy of claim 1, further comprising:

a first mesh pocket attached substantially at an edge of the first foldable cover, a fold line of the first set of vertical fold lines, and a bottom edge, wherein the first mesh pocket has an opening along a top edge; and a second mesh pocket attached substantially at an edge of the second foldable cover, a fold line of the second set of vertical fold lines, and a bottom edge, wherein the second mesh pocket has an opening a top edge.

8. The shower caddy of claim 1, further comprising:

a first D-shaped ring attached to the first spine; and a second D-shaped ring attached to the second spine.

9. The shower caddy of claim 8, wherein the flexible cord is attached to the first and the second D-shaped rings via first and second clips.

10. The shower caddy of claim 1, further comprising:

a clock attached to one of the first and second foldable covers.

11. The shower caddy of claim 1, further comprising:

a clear, water-proof pocket sized and configured for a mobile device.

12. The shower caddy of claim 1, further comprising:

at least one speaker.

13. The shower caddy of claim 1, further comprising:

a pop-out stand for supporting the shower caddy when using on a flat surface, the pop-out stand having a strap to limit rotation of the pop-out stand.

14. A shower caddy, comprising:

a first foldable cover, attached to a back cover via a first spine, the first spine defined by a first set of vertical fold lines;

a second foldable cover, attached to the back cover via a second spine, the second spine defined by a second set of vertical fold lines, wherein the back cover includes a generally rectangularly-shaped surface having a mirror;

a first elongated lighting device aligned with the first spine; and a second elongated lighting device aligned with the second spine.

15. The shower caddy of claim 14, wherein the first elongated lighting device is aligned within a mesh pocket attached to first set of vertical fold lines and a bottom edge of the first spine and wherein the second elongated lighting device is aligned within a mesh pocket attached to second set of vertical fold lines and a bottom edge of the second spine.

16. The shower caddy of claim 15, further comprising:

a flexible cord or strap for hanging the shower caddy on a shower head, wherein the flexible cord includes a length adjustable clip at least one suction cup.

17. The shower caddy of claim 16, further comprising:

a pop-out stand for supporting the shower caddy when using on a flat surface, the pop-out stand having a strap to limit rotation of the pop-out stand.

18. A shower caddy, comprising:

a first foldable cover, attached to a back cover via a first spine, the first spine defined by a first set of vertical fold lines and having a first D-shaped ring attached to tab thereof;

a second foldable cover, attached to the back cover via a second spine, the second spine defined by a second set of vertical fold lines and having a second D-shaped ring attached to a second tab thereof, wherein the back cover includes a generally rectangularly-shaped surface having a mirror, wherein the mirror is a steam-resistant mirror having opposed side margins and a width less than a total width of the back cover;

a first elongated lighting device aligned with the first spine, wherein the first elongated lighting device is aligned within a mesh pocket attached to first set of vertical fold lines and a bottom edge of the first spine;

a second elongated lighting device aligned with the second spine, and wherein the second elongated lighting device is aligned within a mesh pocket attached to second set of vertical fold lines and a bottom edge of the second spine;

a first mesh pocket attached substantially at an edge of the first foldable cover, a fold line of the first set of vertical fold lines, and a bottom edge, wherein the first mesh pocket has an opening along a top edge;

a second mesh pocket attached substantially at an edge of the second foldable cover, a fold line of the second set of vertical fold lines, and a bottom edge, wherein the second mesh pocket has an opening along a top edge;

a flexible cord or strap for hanging the shower caddy on a shower head, wherein the flexible cord includes a length adjustable clip, wherein the flexible cord is attached to the first and the second D-shaped rings via first and second clips;

at least one suction cup; and a pop-out stand for supporting the shower caddy when using on a flat surface, the pop-out stand having a strap to limit rotation of the pop-out stand.

19. The shower caddy of claim 1, further comprising:

a clock attached to one of the first and second foldable covers.

20. The shower caddy of claim 1, further comprising:

a clear, water-proof pocket sized and configured for a mobile device.

* * * * *